United States Patent [19]

Rawlyk

[11] Patent Number: 5,039,197

[45] Date of Patent: Aug. 13, 1991

[54] CABLE AND TAPE STRUCTURES THEREFOR

[75] Inventor: Michael G. Rawlyk, Saskatchewan, Canada

[73] Assignee: Northern Telecom Limited, Montreal, Canada

[21] Appl. No.: 498,257

[22] Filed: Mar. 22, 1990

[51] Int. Cl.$^5$ .............................................. G02B 6/44
[52] U.S. Cl. .................................................... 385/102
[58] Field of Search .................... 174/23 R, 23 c, 107; 350/96.23

[56] References Cited

U.S. PATENT DOCUMENTS

| | | | |
|---|---|---|---|
| 4,595,431 | 6/1986 | Bohannon Jr. et al. | 174/107 X |
| 4,767,184 | 8/1988 | Ogasawara et al. | 174/23 R X |
| 4,874,219 | 10/1989 | Arroyo et al. | 350/96.23 |
| 4,963,695 | 10/1990 | Marciano-Aledstinelli et al. | 174/23 R X |

Primary Examiner—John D. Lee
Assistant Examiner—Stephen W. Barns
Attorney, Agent, or Firm—R. J. Austin

[57] ABSTRACT

A composite tape structure having a metal tape layer and a layer of swellable water blocking material, the two layers bonded together face-to-face. The tape structure is for use as a composite shield and water blocking structure surrounding the core of a cable, preferably a telecommunications cable. One edge region of the metal tape layer may extend beyond the layer of water blocking material so that overlapping edges of the metal tape layer confront each other for bonding purposes when used as shield. The layer of water blocking material may be formed from tape impregnated with or provided with a paticulate swellable material, or the particulate material may be applied directly to and bonded to the metal tape layer.

20 Claims, 5 Drawing Sheets

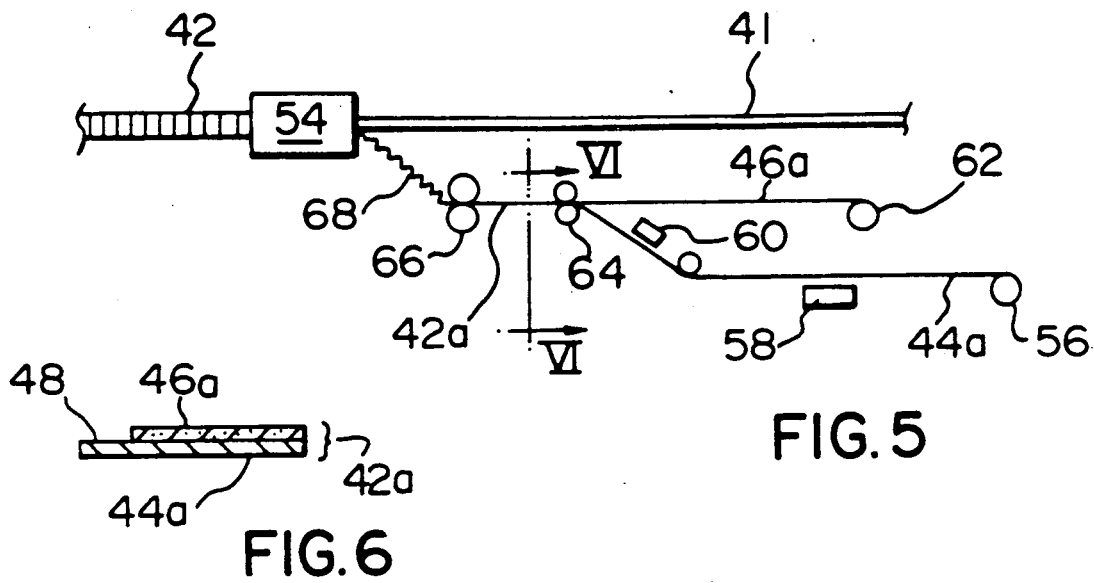
FIG. 5
FIG. 6
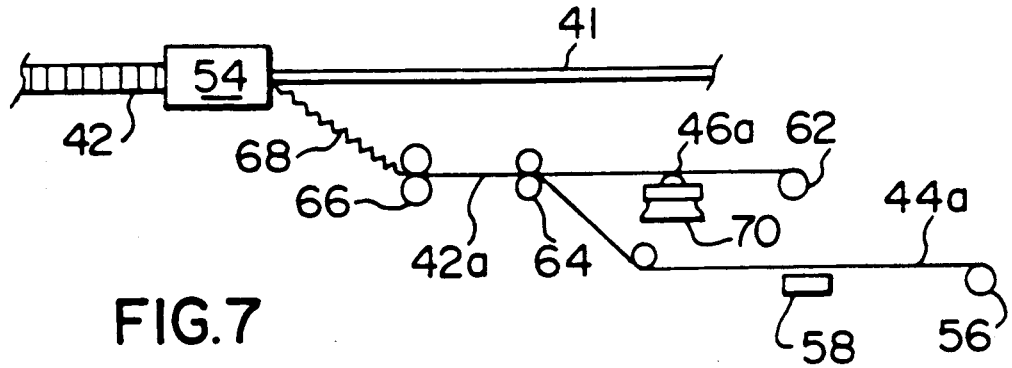
FIG. 7
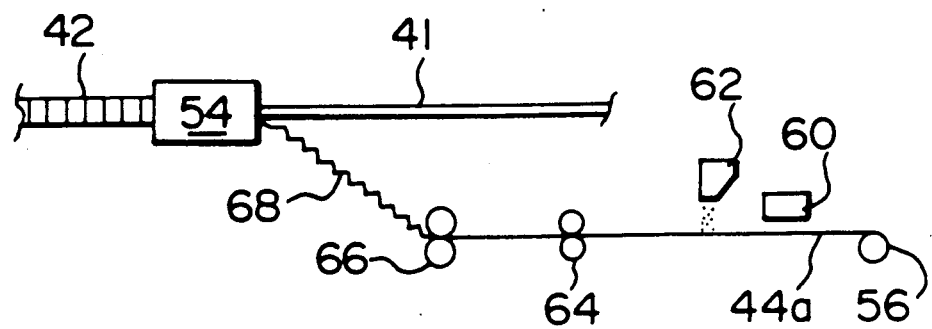
FIG. 8

CABLE AND TAPE STRUCTURES THEREFOR

This invention relates to cables and tapes therefor.

In the manufacture of power and telecommunications cables, a core of the cable is normally surrounded by a metal shield which is, in turn, covered by an extruded polymeric jacket. In certain of these constructions, it has recently become known to locate a tape layer of swellable water blocking material between the metal shield and the core, this tape layer being provided by a tape of the swellable material which is wrapped around the core in an in-line operation and before the shield is added. In the manufacture of this tape structure, because the water blocking material has substantially no rigidity, a binder tape needs to be wrapped around the tape layer of water blocking material immediately after it has been applied around the core so as to hold it in position before the wrapping of the shield around the water blocking material. Hence, the use of a tape layer of swellable water blocking material has necessarily included extra processing steps and apparatus for the application of the binder together with attendant additional costs. In addition, by using the binder tape, the percentage "downtime" in use of the manufacturing process is potentially increased because of probable breakage of the binder tape. Binder tape breakage also tends to increase the amount of cable wastage.

The present invention provides a tape in the use of which, for the manufacture of cable, a binder tape may be avoided while producing water blocking material underneath the shield. The invention also provides a method of making the inventive tape and an inventive cable together with its method of manufacture.

According to one aspect of the present invention there is provided a composite tape structure comprising a metal tape layer and a layer of swellable water blocking material, the two layers bonded together with the layer of swellable water blocking material extending along one side surface of the metal tape layer.

The composite tape structure of the invention as defined above, may be applied to a cable core to provide the swellable water blocking material and the shield and is applied in a single operation with the swellable material supported by the metal layer, before, during and after application. Hence, the swellable water blocking material and the shield are applied simultaneously around the cable and a binder tape is thus not required for holding the swellable material in position. Any disadvantages which would be inherent in the use of a binding tape are thereby avoided. The swellable material is preferably provided as a tape layer and the metal tape layer and water blocking tape are bonded together. An adhesive may be provided upon the one side surface of the metal tape layer. Alternatively, the metal tape layer has a thermoplastic coating on the one side surface, the thermoplastic coating being softened to provide an adhesive.

In a preferred construction, the metal tape layer is provided on one side surface with a thermoplastic coating extending continuously along one longitudinally extending edge region of the metal tape layer and on the other side surface with a thermoplastic coating extending continuously along the other edge region, and the one edge region of the metal layer extends laterally beyond the tape layer of swellable water blocking material so that the thermoplastic coating is unobscured on said one longitudinally extending edge region. Thus, when the composite tape structure is wrapped around the core of a cable to provide a composite shield and a water blocking structure and with the shield layer on the outside of the water blocking layer, the two edge regions of the metal tape layer may be caused to overlap and the thermoplastic coatings to fuse together by the application of heat such as when extruding jacket material onto the shield.

It is also preferable that the composite tape structure according to the invention has laterally extending corrugations lying side-by-side longitudinally of the tape.

According to another aspect of the present invention there is provided a method of making a composite tape structure comprising providing a metal tape layer and a swellable water blocking material and causing a bond between the metal tape layer and the water blocking material with the water blocking material extending along and providing another layer on said one side surface of the metal tape layer.

The layer of water blocking material may be provided by a tape layer which is laid against and bonded to the metal tape layer or by a powdered form of the swellable water blocking material which is applied along the one surface of the metal tape layer.

The invention also includes a cable having a core, a composite shield and water blocking tape structure surrounding the core and a polymeric jacket surrounding the composite shield and water blocking tape structure wherein the composite shield and water blocking tape structure comprises a radially outer metal shield layer and a radially inner layer of swellable water blocking material, the two layers bonded together.

Particularly, the present invention provides a telecommunications cable comprising a core having elongate transmission elements extending along the core, a composite shield and water blocking structure surrounding the core and a polymeric jacket surrounding the composite shield and water blocking structure wherein the composite shield and water blocking structure comprises a radially outer metal shield layer and a radially inner layer of swellable water blocking material with the two layers bonded together.

The telecommunications cable according to the invention may be an electrical cable or an optical cable. In the case where it is an optical cable, it is preferable that the core comprises an elongate plastic extruded core member having a longitudinally extending tensile reinforcing means and a plurality of grooves formed in the core member, the grooves extending longitudinally of the core member and spaced apart angularly around a longitudinal axis of the core member, the transmission elements comprising optical fibers lying within and extending along some at least of the grooves and the composite shield and water blocking tape structure extending around the core so as to bridge across each of the grooves with the radially inner layer facing into each of the grooves.

The invention also provides a method of making a cable comprising:- providing a composite tape structure comprising a metal tape layer and a layer of swellable water blocking material, the two layers bonded together with the layer of swellable water blocking material extending along one side surface of the metal tape layer; moving a core of the cable along a passline; and during movement of the core along the passline:- 1) wrapping the composite tape structure around the core to provide a composite shield and water blocking tape structure with the metal tape layer being an outer layer of the structure to provide a metal shield for the core and with the layer of swellable water blocking material being an inner layer of the structure; and then 2) forming a polymeric jacket around the composite shield and water blocking tape structure.

Embodiments of the invention will now be described, by way of example, with reference to the accompanying drawings, in which:

FIG. 5 is a diagrammatic side elevational view of apparatus for forming a composite tape structure and applying it to a cable core during manufacture of the cable of the first embodiment;

FIG. 6 is a cross-sectional view taken along line VI—VI in FIG. 5 of the composite tape structure;

FIGS. 7 and 8 are diagrammatic side elevational views of apparatus for forming composite tape structures and applying them to cable cores during the manufacture of cables according to second and third embodiments;

In the manufacture of a telecommunications cable, whether this cable be an electrical cable or an optical cable, a cable core is normally surrounded by a metal shield and this, in turn, is surrounded by a polymeric jacket. In cases where it is deemed desirable to apply a swellable water blocking material between the shield and the cable core, the water blocking material is applied as a tape layer which is wrapped around the cable core before a metal tape layer is wrapped around the core for forming the metal shield. Because the swellable water blocking tape layer is extremely flimsy and non-rigid in nature, it is essential to wrap at least one binding tape helically around the layer of swellable water blocking material to hold it in its desired position around the core before application of the metal tape layer.

Figure 1:
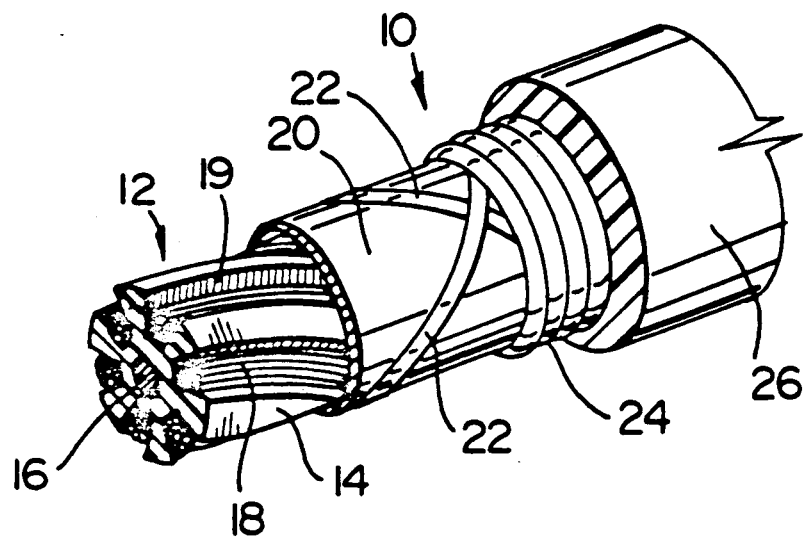
FIG. 1 is an isometric view of part of a sectioned prior art cable.

This is illustrated in the prior art construction shown in FIG. 1 which represents an optical cable 10. The optical cable 10 has a core 12 composed of an elongate plastic extruded core member 14, a longitudinally extending tensile reinforcing means which may be a central strength member 16, and transmission elements housed in helically extending grooves 19 formed around the outside of the core member 14. These transmission elements are either groups of optical fibers directly inserted into the grooves or alternatively, comprise flexible plastics tubes 18, as shown held within the grooves, the plastics tubes containing groups of optical fibers. A water blocking material which may comprise a grease or jelly water blocking substance, or a swellable water blocking powder surrounds the transmission elements within the grooves.

Surrounding the core 12 in this prior construction is a tape layer of swellable water blocking material 20 having longitudinally extending edges which abut or overlap one over the other. This tape layer is surrounded by one or possibly two helically extending binding tapes 22 and around the tape layer 20 is a corrugated metal shield 24. Immediately surrounding the metal shield is an extruded polymeric jacket 26.

Figure 2:
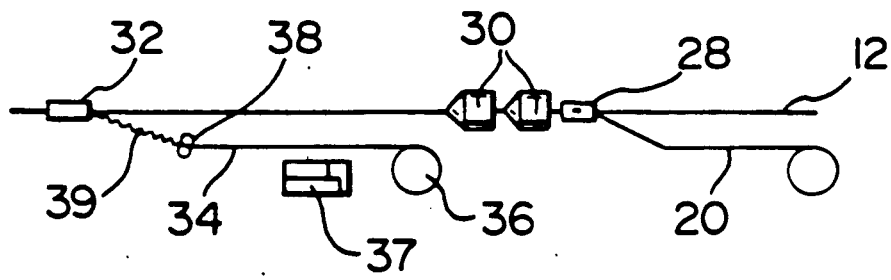
FIG. 2 is a diagrammatic side elevational view of apparatus used in the manufacture of the prior art cable of FIG. 1.

The cable 10 is manufactured partly by the use of the apparatus shown in FIG. 2. As shown by FIG. 2, the core 12 is moved along a passline, through tape forming apparatus 28 at which the layer 20 of swellable water blocking tape is applied around the core, axially through two binding heads 30, to apply the binding tapes 22, and then through a further tape forming apparatus 32 at which the shield 24 is provided. The shield is provided by a flat metal tape 34 issuing from a reel 36, the tape 34 passing across a welder 37 for welding together tapes from successive reels. The tape 34 passes through corrugating rolls 38 to be formed with laterally extending and longitudinally spaced corrugations as shown at 39 in FIG. 2.

With the method of making the prior art cable, the binding heads 30 and the reeled binding tape add to the cost of manufacture of the cable. Further to this, binding tapes are known to break, sometimes frequently during operation. Such breakage adds to the cost of manufacture of a cable and also adds to the time required for its manufacture. Binding tape usage is therefore highly inconvenient and is expensive.

As will be seen from the embodiments of the invention now to be described, the use of a binding tape around swellable water blocking material is avoided.

Figure 3:
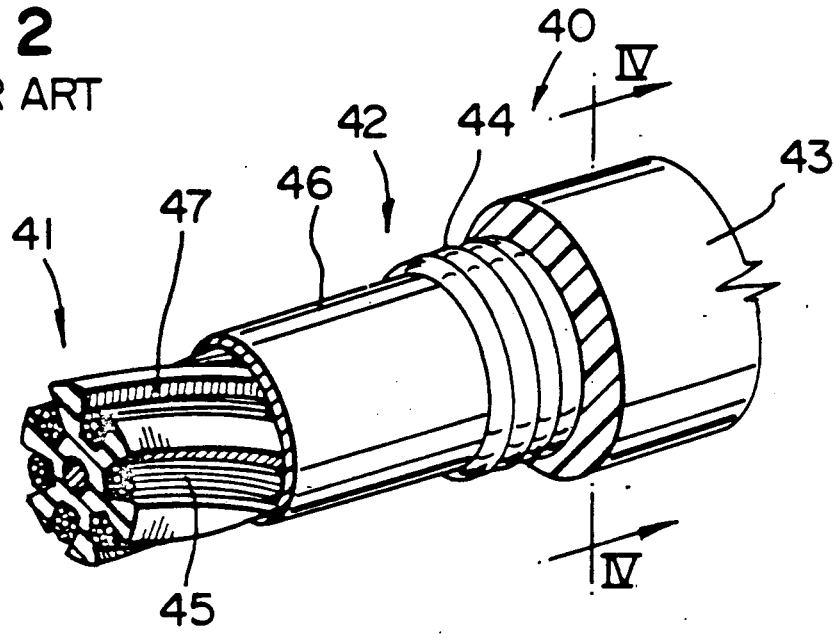
FIG. 3 is an isometric view of part of a sectioned cable according to a first embodiment.
Figure 4:
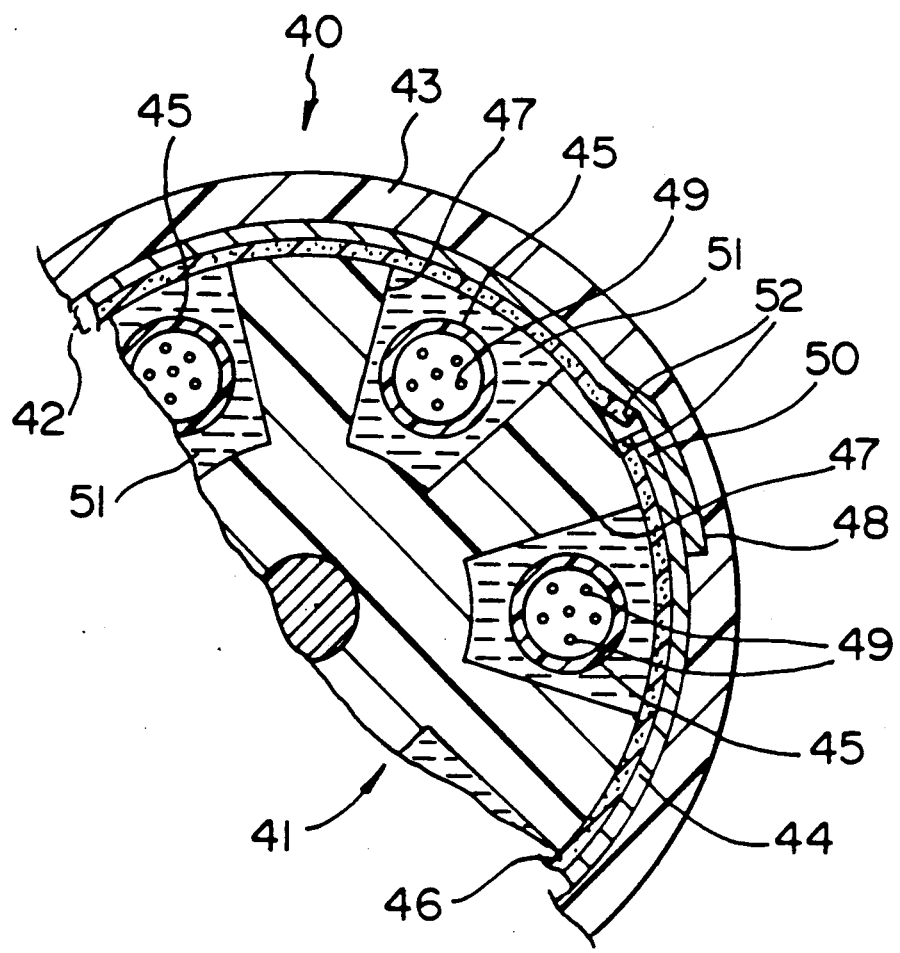
FIG. 4 is a cross-sectional view through the cable of the first embodiment taken along line IV—IV in FIG. 3.

As shown in FIGS. 3 and 4, an optical cable 40 according to a first embodiment comprises a core 41 and a jacket 43 similar in construction to those described in the first embodiment. Flexible plastic tubes 45 are disposed within and extend along grooves 47 of the core, the tubes each housing a group of optical fibers 49 (FIG. 4). The space in each groove surrounding its tube 45 is occupied by a conventional water blocking grease or jelly 51 or a swellable water blocking powder such as described in U.S. Pat. No. 4,401,366 granted to T. Hope. Between the core 41 and the jacket 43 is provided a composite shield and water blocking tape structure 42 comprised of two layers, i.e. an outer metal shield layer 44 and a radially inner layer 46 of swellable water blocking material, the two layers being bonded together. As shown particularly by FIG. 4, longitudinally extending edge regions 48 and 50 of the shield layer 44 overlap. The shield layer is coated completely over both sides with a plastic coating which is an ethylene copolymer. The confronting layers of ethylene copolymer at the overlapped edges 48 and 50 are fused together to provide a seal between the overlapped edges, the fusing together of the plastic layers being caused by a softening of the ethylene copolymer by heat provided during extrusion of the jacket 43 onto the shield. As can be seen from FIG. 4, the layer 46 of the water blocking material does not extend between the overlapped edges, but the edges 52 of the water blocking material substantially butt together. As may be seen from FIG. 3, no binding tape extends around the layer 46 of water blocking material.

A composite tape structure 42a is manufactured and applied to the core 41 of the cable of the first embodiment to form the composite shield and water blocking structure 42 in the following manner.

As shown in FIG. 5, the core 41 is fed through a shield forming apparatus 54 of conventional structure. A metal tape 44a for forming the shield layer 44 is drawn from a reel 56 and is passed downstream past a welder 58 and a heater 60 towards the shield forming apparatus 54. Simultaneously with this, a tape 46a of the swellable water blocking material is unreeled from a reel 62 and is fed in the same direction. The swellable water blocking tape 46a is provided by a particulate swellable material, such as sodium polyacrylate, which is held upon a tape substrate or between substrates. The substrates are preferably non-woven and may be in the form of paper.

As the tape 44a passes beneath the heater 60, the heater softens the ethylene copolymer covering one side of the tape and the tape 44a bearing the softened ethylene copolymer passes between pinch rolls 64 together with the tape 46a from reel 62. The softened copolymer sticks to the tape 46a so that, after hardening of the copolymer, the two tapes 44a and 46a are bonded together. The composite tape structure 42a having two layers formed of the bonded tapes 44a and 46a then passes between corrugating rolls 66 where the metal tape layer 44a is formed with longitudinally extending corrugations 68 as shown in FIG. 5, the tape 46a being forced to conform to the corrugated shape of the metal. The corrugating process positively increases the degree of bonding between the two layers.

The tapes 44a and 46a are of such relative widths and are relatively disposed so that when combined together to form the composite tape structure 42a as shown in FIG. 6, the water blocking tape 46a extends only partly across the one side surface of the metal tape 44a so that this one side surface is not obscured by the tape 46a at the longitudinally extending edge region 48 of the metal tape. Hence, as the composite tape structure 42a is wrapped around the core 41 as it passes through the shield forming apparatus 54, the longitudinally extending edge regions 48 and 50 overlap so that the ethylene copolymer coatings directly confront one another to enable the fusing process to take place between them. The width of the water blocking material tape layer 46 is such that the edges 52 substantially abut when assembled onto the core as described above and with reference to FIG. 4.

As may be seen from the first embodiment and with reference to FIG. 5, the use of binding heads, binding reels and binding tapes, such as are described in the prior art apparatus of FIG. 2, are completely unnecessary thereby avoiding disadvantages normally associated with use of binding tapes.

In use of the cable of the first embodiment, the swellable water blocking layer 46 is successful in preventing moisture from passing along the inside surface of the metal shield layer 44. Contact of any portion of the layer 46 by moisture results in a swelling of the sodium polyacrylate material to provide its water blocking function by blocking all gaps between the shield layer and the core 41 and the water blocking substance 51 in the grooves.

FIG. 7 shows an apparatus for the manufacture of an optical cable of a second embodiment which is of the same structure as that of the first embodiment with reference to FIGS. 3 and 4 except that the ethylene copolymer does not adhere the tapes 44a and 46a together. In the structure of the second embodiment, the ethylene copolymer extends only along the surfaces of the overlapping edge regions 48 and 50 of the shield layer 46 at which fusing is to occur between the coatings of the ethylene copolymer. In the apparatus shown in FIG. 7, to provide adherence between the two tape layers 44a and 46a, the tape 46a is passed over an adhesive applicator 70. A heater 60 such as described with reference to FIG. 5 is not included. Otherwise the apparatus is as described with reference to FIG. 5. As the tape 46a passes over the adhesive applicator 70, an adhesive is controllably coated onto the one surface of the tape 46a to provide adherence to the tape 44a. The adhesive may be any suitable adhesive for this purpose and needs to be compatible with the materials of the two layers. One suitable adhesive is that supplied by Minnesota Manufacturing & Machinery Limited under the trade name "Super 77".This adhesive is used is a vapor barrier adhesive in buildings for causing adherence between plastic vapor barrier sheets and wooden studs.

The apparatus shown in FIG. 8 is used in the manufacture of an optical cable which is substantially of the structure described with reference to the first embodiment except that the tape layer 46 of water blocking material is replaced by a layer of particulate sodium polyacrylate. In the apparatus of FIG. 8, the metal tape layer 44a passes from its reel 56 beneath a heater 60 as described in the first embodiment to soften the thermoplastic coating and then beneath a hopper 62 which supplies the particulate sodium polyacrylate material onto the softened copolymer as the tape passes beneath. The tape 44a bearing the particulate sodium polyacrylate then proceeds between the consolidating rolls 64 and the corrugating rolls 66 before proceeding to the shield forming apparatus 54.

Figure 9:
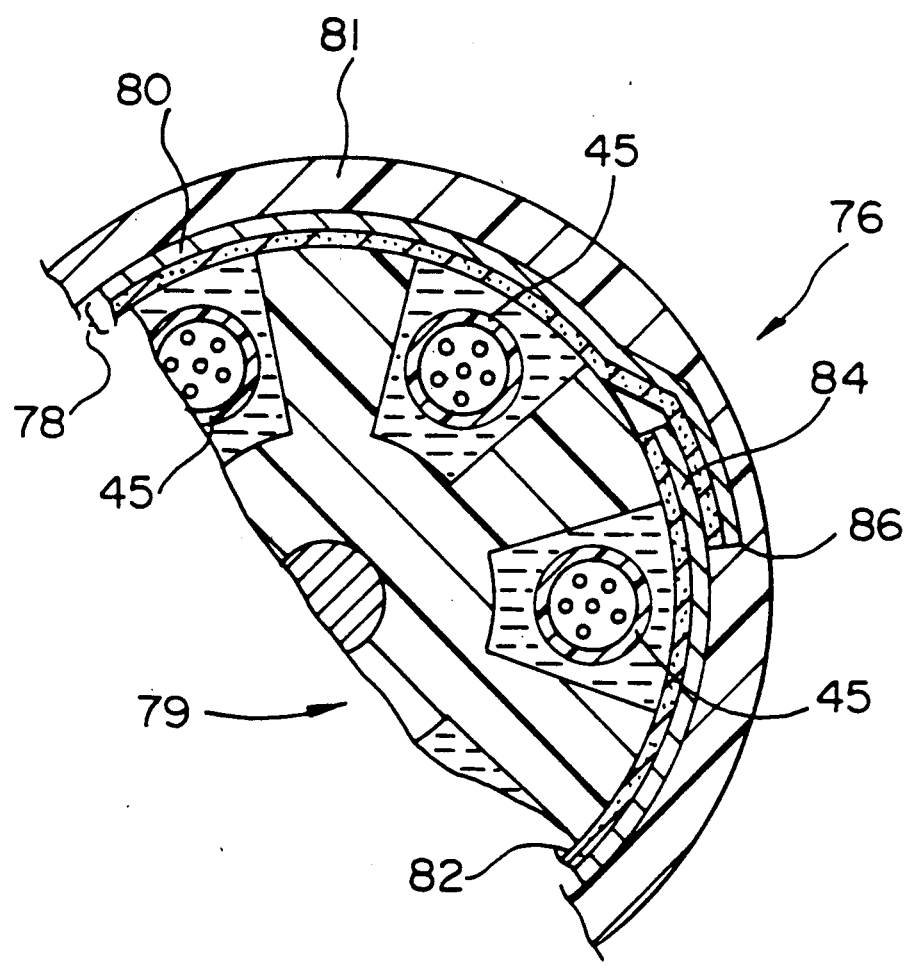
FIG. 9 is a cross-sectional view through a cable of a fourth embodiment.

In all of the above embodiments, the swellable water blocking material extends only partly across the metal tape 44a so that a longitudinally extending edge region of the metal tape is completely unobscured as shown in FIG. 6. However, as shown in FIG. 9, in a fourth embodiment, an optical cable 76 which is basically of the structure shown in the first embodiment with reference to FIGS. 3 and 4 does not have the unobscured edge region. In the fourth embodiment, a composite shield and water blocking tape structure 78 lying between a core 79 and a polymeric jacket 81 has a corrugated metal shield layer 80 and a layer 82 of swellable water blocking material lying radially within the metal shield layer with the two layers bonded together. As can be seen from FIG. 9, the two layers 80 and 82 are laterally coextensive so that the water blocking layer 82 extends between the overlapped longitudinally extending edge regions 84 and 86 of the metal shield layer. In this case, the edge regions 84 and 86 are not fused together as in the preceding embodiments. However, the interpositioning of the water blocking layer 82 between the edge regions 84 and 86 prevents the ingress of moisture between these edge regions and towards the cable core in that any moisture present beneath the jacket, upon contacting the edge of the layer 82 causes a swelling of layer 82 within the overlap to provide water blockage. The composite structure 78 of the cable of the fourth embodiment may be constructed upon any of the apparatus described with regard to the first, second or third embodiments.

In modifications (not shown) of any of the above embodiments or any other embodiment of cable to be described, composite shield and water blocking tape structure is of uncorrugated form so that the corrugating rolls 66 described in the apparatus are unnecessary. Further to this, in any embodiment or modification, the metal of the shield layer itself may be of any suitable material such as carbon steel or aluminum.

Further advantages which stem from the above embodiments are as follows. With regard to embodiments one to three inclusive, a swellable water blocking tape overlap is avoided therefore reducing the cost of such an overlap. In addition, in all embodiments, because the two layers of material are bonded together, then the shield layer may be positioned more closely around the core than would be possible if the swellable water blocking material were applied to the core before application of the shield layer. As a result, cable diameters may be advantageously minimized. In addition to this, where swellable water blocking tape layers are used as in the first and second embodiments, these tape layers may have minimal strength in their supporting substrates merely relating to the unreeling process thereby minimizing the cost of such tapes.

The invention also extends to the manufacture of cable in which a composite tape structure for providing the metal shield layer and the layer of swellable water blocking material is preformed and is unreeled as a preformed composite tape structure for wrapping around the cable core. In the fifth, sixth and seventh embodiments to be described, manufacture of preformed tape structures are described.

Figure 10:
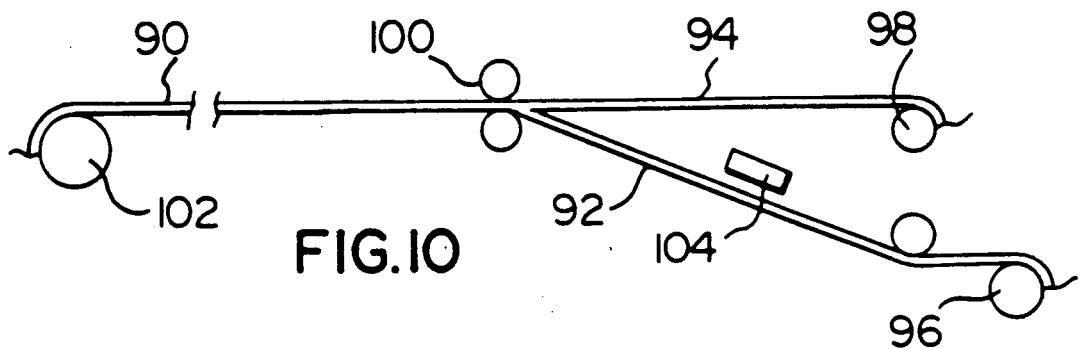
FIGS. 10, 11 and 12 are diagrammatic side elevational views of apparatus for the manufacture of composite tape structures according to fifth, sixth and seventh embodiments.

As shown in FIG. 10, in a fifth embodiment, a preformed composite tape structure 90 is composed of a metal tape layer 92 and a tape layer 94 of the swellable water blocking material. These tape layers are fed respectively from reels 96 and 98 between consolidating rolls 100 at which they converge to form the tape 90. The tape 90 is reeled onto a reel 102 for storage purposes and before being placed in an in-line apparatus for the manufacture of an optical cable. As shown in FIG. 10, the tape layer 92 has a coating of ethylene acrylic copolymer, on both of its surfaces as described in the first embodiment, and is fed beneath a heater 104 for softening the coating on one side of the layer 92 in a similar fashion to that described with reference to FIG. 5. The two tapes when passing between the consolidating rolls 100 bond together and the ethylene acrylic coating hardens to form a bond.

Figure 11:
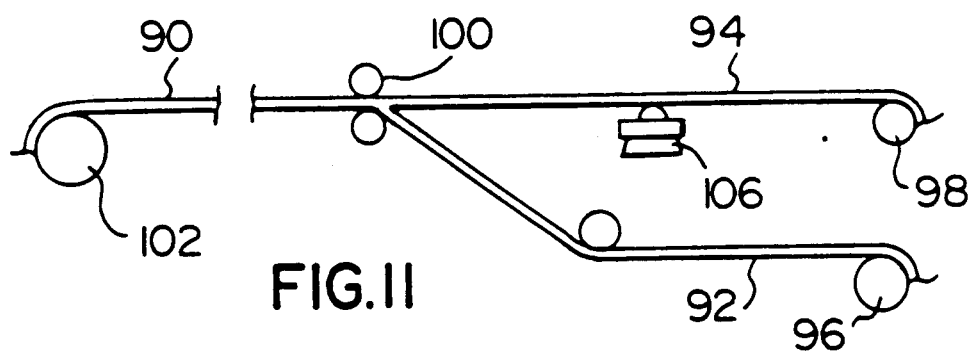

In a sixth embodiment as shown by FIG. 11 and using the same reference numerals as in FIG. 10 for like parts, the tape 94 is fed over an adhesive applicator 106 to apply adhesive to one side surface of the tape before passing the tapes 92 and 94 between the consolidating rolls. In this case, the tape 92 need not have the ethylene acrylic copolymer covering the whole of each of its two sides.

Figure 12:
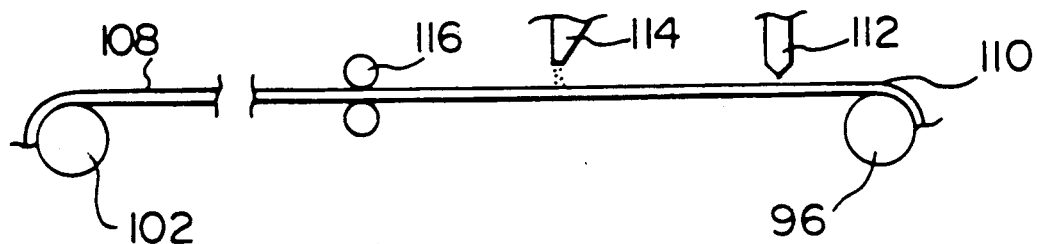

In a seventh embodiment as shown in FIG. 12, a tape 108 is formed from a metal tape 110 having a layer of sodium polyacrylate particulate material bonded to one of its surfaces. In this case, the metal tape 110 is provided with an adhesive from an adhesive applicator 112 before passing beneath a powder applicator 114 and then proceeding through consolidating rolls 116 to bond the particles to the one surface of the metal tape layer. Alternatively, the adhesive applicator 112 is replaced by a heater (not shown) for softening an ethylene acrylic layer on one side of the metal tape 110 so that the particles of sodium polyacrylate adhere to the softened layer.

In any of the embodiments five, six or seven, the swellable water blocking material may extend completely across the width of the metal tape or alternatively the metal tape may extend laterally beyond the water blocking material to provide an unobscured longitudinally extending edge region as shown in FIG. 6 for instance.

Figure 13:
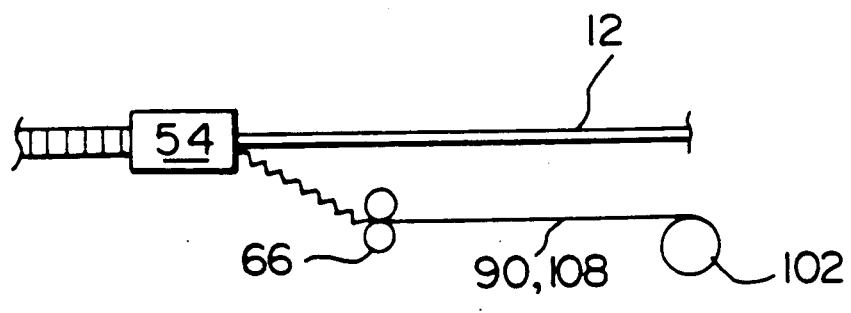
FIG. 13 is a diagrammatic side elevational view of apparatus for applying a composite tape structure to a cable core, the tape having been made upon the apparatus shown in any of FIGS. 10, 11 and 12.

In an eighth embodiment as shown in FIG. 13, an optical cable of the construction shown in any of the first to the fourth embodiments is provided upon apparatus having preformed tape 90 or 108 as described with reference to the fifth to seventh embodiments (FIGS. 10 to 12). As shown by FIG. 13, the tape 90 or 108 on the spool 102 is fed directly through corrugating rollers 66 and then through the shield forming apparatus 54, as described with regard to FIG. 5, before being wrapped around the core 12 for the cable.

What is claimed is:

1. A cable having a core, a composite shield and water blocking tape structure surrounding the core as a wrapping around the core, and a polymeric jacket surrounding the composite shield and water blocking tape structure wherein the composite shield and water blocking tape structure comprises a radially outer metal shield tape layer and a radially inner layer comprising a swellable water blocking material, the radially inner layer bonded to the metal shield tape layer by an interfacial bonding agent between the two layers.

2. A telecommunications cable comprising a core having elongate transmission elements extending along the core, a composite shield and water blocking tape structure surrounding the core as a wrapping around the core and a polymeric jacket surrounding the composite shield and water blocking tape structure wherein the composite shield and water blocking tape structure comprises a radially outer metal shield tape layer and a radially inner layer comprising a swellable water blocking material, the radially inner layer bonded to the metal shield tape layer by an interfacial bonding agent between the two layers.

3. A telecommunications cable according to claim 2 wherein the metal shield tape layer has an inner surface having a longitudinally extending edge region which extends laterally beyond the radially inner layer and said longitudinally extending edge region overlaps another longitudinally extending edge region of the shield tape layer with the edge regions bonded together by a thermoplastics material.

4. A telecommunications cable according to claim 3 wherein the composite shield and water blocking tape structure has corrugations which extend circumferentially of and are spaced circumferentially of the cable.

5. A telecommunications cable according to claim 3 wherein the inner surface of the metal shield tape layer has a thermoplastic coating from edge-to-edge of the layer, the thermoplastic coating providing the bonding agent between the two layers.

6. A telecommunications cable according to claim 2 wherein the core comprises an elongate plastic extruded core member having a longitudinally extending tensile reinforcing means and a plurality of grooves formed in the core member, the grooves extending longitudinally of the core member and spaced apart angularly around the longitudinal axis of the core member, the transmission elements comprising optical fibers lying within and extending along some at least of the grooves, and the composite shield and water blocking tape structure extends around the core so as to bridge across each of the grooves with the radially inner layer facing into each of the grooves.

7. A telecommunications cable according to claim 6 wherein each transmission element comprises a flexible tube lying within and extending along each of the grooves, and at least one optical fiber contained within and extending along each tube.

8. A telecommunications cable according to claim 2 wherein the composite shield and water blocking tape structure has longitudinally extending overlapped regions and the radially inner layer is sandwiched between overlapped edge regions of the outer layer.

9. A telecommunications cable according to claim 2 wherein the radially inner layer of the composite tape structure further comprises a tape substrate carrying the swellable water blocking material, the metal shield tape layer and the tape substrate bonded together by the interfacial bonding agent between the metal shield tape layer and the tape substrate.

10. A telecommunications cable according to claim 9 wherein the metal shield tape layer has two sides both of which are covered with a plastics coating and the tape substrate and the metal shield tape layer are bonded together by the plastics coating which provides the interfacial bonding agent.

11. A telecommunications cable according to claim 2 wherein the radially inner layer of the composite tape structure consists of particulate swellable water blocking material.

12. A method of making a cable comprising:
providing a composite tape structure comprising a metal tape layer and a layer of swellable water blocking material, the layers bonded together with the layer of swellable water blocking material extending along one side surface of the metal tape layer;
moving a core of the cable along a passline;
and, during movement of the core along the passline;
1) wrapping the composite tape structure around the core to provide a composite shield and water blocking tape structure with the metal tape layer being a radially outer layer of the composite shield and water blocking tape structure to provide a metal shield for the core and with the layer of swellable water blocking material being a radially inner layer of the composite shield and water blocking tape structure; and then
2) forming a polymeric jacket around the composite shield and water blocking structure.

13. A method according to claim 12 comprising providing the composite tape structure in corrugated form with laterally extending corrugations lying side-by-side longitudinally of the composite tape structure.

14. A method according to claim 12 comprising:
providing the composite tape structure with one side surface of the metal tape layer having a thermoplastic coating extending continuously along one longitudinally extending edge region of the metal tape layer, the one longitudinally extending edge region extending laterally beyond the layer of swellable water blocking material, and with the other side surface of the metal tape layer provided with a thermoplastic coating on the other longitudinally extending edge region of the metal tape layer;
wrapping the composite tape structure around the core with the two edge regions overlapping and with the thermoplastic coatings facing one another;
and forming the polymeric jacket by extrusion, the heat of extrusion causing softening and fusing together of the thermoplastic coatings.

15. A method according to claim 14 comprising providing the composite tape structure with the thermoplastic coating on said one side surface extending from edge-to-edge of the metal layer to provide an adhesive between the two layers.

16. A method according to claim 12 comprising:
providing the composite tape structure with the layer of swellable water blocking material extending completely across the width of the metal tape layer;
and wrapping the composite tape structure around the core with the two edge regions overlapping and with the inner layer sandwiched between overlapped edge regions of the outer layer.

17. A method according to claim 12 comprising providing the composite tape structure during movement of the core of the cable along the passline by:
1) moving the metal tape layer and a tape layer of swellable water blocking material longitudinally along converging paths; and
2) causing convergence of the two tape layers and providing a bond between the layers to produce the composite tape structure;
and then causing the composite tape structure to move along a passline so as to converge with the core to enable the composite tape structure to be wrapped around the core.

18. A method according to claim 17 comprising providing the composite tape structure by:
feeding the metal tape layer through an adhesive applicator station;
applying adhesive to the one side of the metal tape layer in the adhesive applicator station;
and then causing convergence of the two layers to cause bonding between the two layers to provide the composite tape structure.

19. A method according to claim 18 comprising corrugating the composite tape structure after the two layers are bonded together to provide laterally extending corrugations which lie side-by-side longitudinally of the composite tape structure.

20. A method according to claim 17 comprising providing the metal tape layer with its one side surface having a coating of thermoplastic material and providing the composite tape structure by causing convergence of the two layers with the thermoplastic coating softened.

* * * * *